(12) United States Patent
Morris

(10) Patent No.: US 7,547,026 B2
(45) Date of Patent: Jun. 16, 2009

(54) WHEELBARROW

(76) Inventor: Richard J. Morris, A29 Princess Highway, Berry, New South Wales (AU) 2535

( * ) Notice: Subject to any disclaimer, the term of this patent is extended or adjusted under 35 U.S.C. 154(b) by 162 days.

(21) Appl. No.: 11/664,205

(22) PCT Filed: Apr. 19, 2006

(86) PCT No.: PCT/AU2006/000544

§ 371 (c)(1),
(2), (4) Date: Mar. 29, 2007

(87) PCT Pub. No.: WO2007/009152

PCT Pub. Date: Jan. 25, 2007

(65) Prior Publication Data

US 2008/0116666 A1 May 22, 2008

(30) Foreign Application Priority Data

Jul. 22, 2005 (AU) .............................. 2005903908

(51) Int. Cl.
*B62B 1/24* (2006.01)
(52) U.S. Cl. ....................... 280/47.31; 280/47.41; 298/3
(58) Field of Classification Search ............... 280/47.31, 280/47.34, 652, 653, 654, 47.2, 47.3, 47.315, 280/47.32, 47.33, 47.26, 47.27
See application file for complete search history.

(56) References Cited

U.S. PATENT DOCUMENTS

| 1,032,009 | A | * | 7/1912 | Long | 298/3 |
| 1,735,527 | A | * | 11/1929 | Cwik | 280/43.24 |
| 2,037,222 | A | * | 4/1936 | Farrar | 298/3 |
| 2,240,585 | A | * | 5/1941 | Taylor | 298/3 |
| 2,744,735 | A | * | 5/1956 | Selvage | 366/46 |

(Continued)

FOREIGN PATENT DOCUMENTS

CA 2303627 10/2000

*Primary Examiner*—Christopher P Ellis
*Assistant Examiner*—Bridget Avery
(74) *Attorney, Agent, or Firm*—Sean S. Swidler; IpHorgan Ltd.

(57) ABSTRACT

A wheelbarrow has a frame, having a top portion (12) and an undercarriage portion (14). There is an open topped vessel (15) mounted on the top portion (12) of the frame, and a pair of handle bars (16, 17) extending rearwardly and integrally from the top portion (12) of the frame. The wheelbarrow also has a pair of ground engagable legs (18, 19), and a front wheel (20) is connected to a front part of the undercarriage portion (14) of the frame, and a rear wheel (21) is connected to a rear part of the undercarriage portion (14) of the frame. The rear wheel (21) is aligned with the front wheel (20). There are pivot axis means (22, 24, 25) of the wheelbarrow for allowing the top portion (12) of the frame to pivot relative to the undercarriage portion (14) of the frame. Manually controllable linkage means (26,27,29,30,31,32) are also provided which are adjustable between first and second positions for allowing a user to link the top and undercarriage portions (12, 14) of the frame when in a first position so that they are unable to pivot relative to each other about the pivot axis means, and for allowing a user to unlink the top and undercarriage portions (12, 14) of the frame when in a second position so that they are able to pivot relative to each other about the pivot axis means.

9 Claims, 6 Drawing Sheets

U.S. PATENT DOCUMENTS

| | | | |
|---|---|---|---|
| 2,918,133 A * | 12/1959 | Ericsson | 180/19.1 |
| 3,092,418 A * | 6/1963 | Themascus | 298/3 |
| 4,789,171 A | 12/1988 | Porter | |
| 5,350,030 A * | 9/1994 | Mawhinney et al. | 180/19.3 |
| 6,193,319 B1 | 2/2001 | Kielinski | |
| 6,390,496 B1 | 5/2002 | Eicher | |
| 6,886,838 B1 * | 5/2005 | Zimmerman | 280/47.31 |
| 7,396,027 B1 * | 7/2008 | Lovmark | 280/47.34 |

* cited by examiner

WHEELBARROW

FIELD OF THE INVENTION

The present invention relates to wheelbarrows and, in particular, to a two-wheeled wheelbarrow that is easier to tip and manoeuvre than conventional wheelbarrows.

BACKGROUND OF THE INVENTION

Conventional wheelbarrows have a single front wheel and a pair of opposed rear legs for supporting and maintaining upright balance of the wheelbarrow when it is not being lifted for movement. When these wheelbarrows carry a heavy load, they require considerable strength of the user to tip the wheelbarrow forward by pivotal motion about its front wheel.

SUMMARY OF THE INVENTION

It is an object of the present invention to provide a wheelbarrow that overcomes, or substantially ameliorates, the aforementioned shortcomings of the prior art, or at least provides a useful alternative.

According to the invention, there is provided a wheelbarrow comprising:
(a) a frame, having a top portion and an undercarriage portion,
(b) an open topped vessel mounted on the top portion of the frame,
(c) a pair of handle bars extending rearwardly from the top portion of the frame,
(d) a pair of ground engagable legs,
(e) a first wheel connected to a front part of the undercarriage portion of the frame, and
(f) a second wheel connected to a rear part of the undercarriage portion of the frame and rearwardly aligned with the first wheel,
(g) pivot axis means for allowing the top portion of the frame to pivot relative to the undercarriage portion of the frame, and
(h) manually controllable linkage means adjustable between first and second positions for allowing a user to link the top and undercarriage portions of the frame when in a first position so that they are unable to pivot relative to each other about the pivot axis means, and for allowing a user to unlink the top and undercarriage portions of the frame when in a second position so that they are able to pivot relative to each other about the pivot axis means.

Preferably, the linkage means includes a finger operated trigger pivotally mounted to one of the handle bars. It is preferred that the trigger is operated by the thumb.

In a preferred form, the linkage means also includes a lever arm pivotally connected at a first end thereof to the top portion of the frame and having a second end adapted to releasably engage the undercarriage portion of the frame at a rear end thereof. When so engaged by operation of the trigger, the pivoting of the wheelbarrow about the first wheel lifts the second wheel from the ground.

It is preferred that the linkage means further includes a spring loaded control sub-assembly which has a pivot control arm that is pivotally connected at a free end thereof to a first end of a control rod, the control rod having a second end that is pivotally connected to a free end of the trigger.

In a preferred form, the control sub-assembly also includes a control shaft which interconnects the lever arm and the pivot control arm, so that pivotal motion of the pivot control arm causes pivotal motion of the lever arm.

Preferably, the control sub-assembly further includes a coil spring which surrounds a portion of the control shaft and has a first end that presses against the top portion of the frame and a second end that presses against the pivot control arm, so that pivotal motion of the lever arm is spring loaded.

The second end of the lever arm preferably includes a hooked portion.

The lever arm may also include means for adjusting the distance of the hooked portion from the point of pivotal connection of the lever arm to the top portion of the frame.

DETAILED DESCRIPTION OF PREFERRED EMBODIMENT

Figure 1:
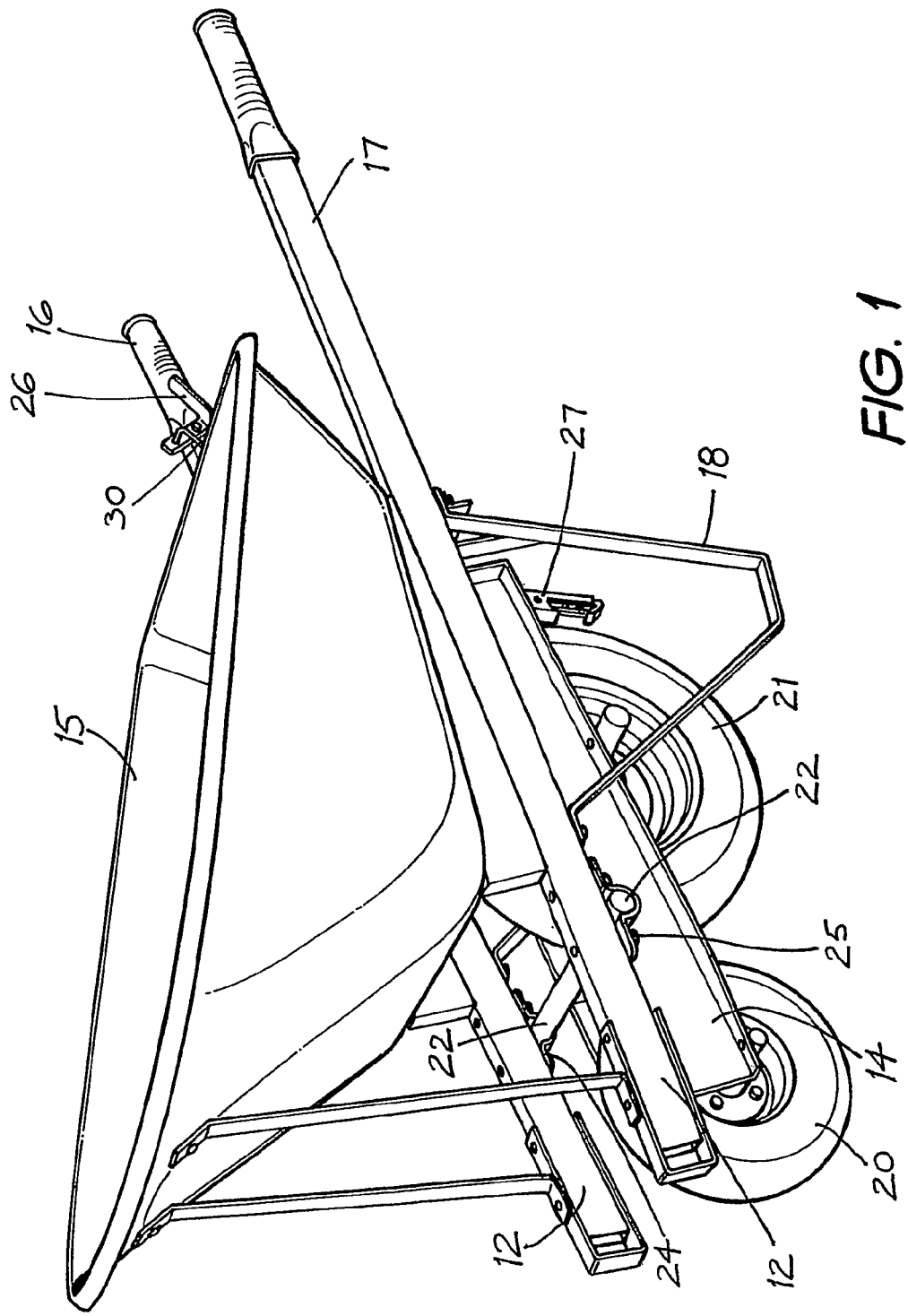
FIG. 1 is a front perspective view of a wheelbarrow according to a preferred embodiment of the present invention.
Figure 2:
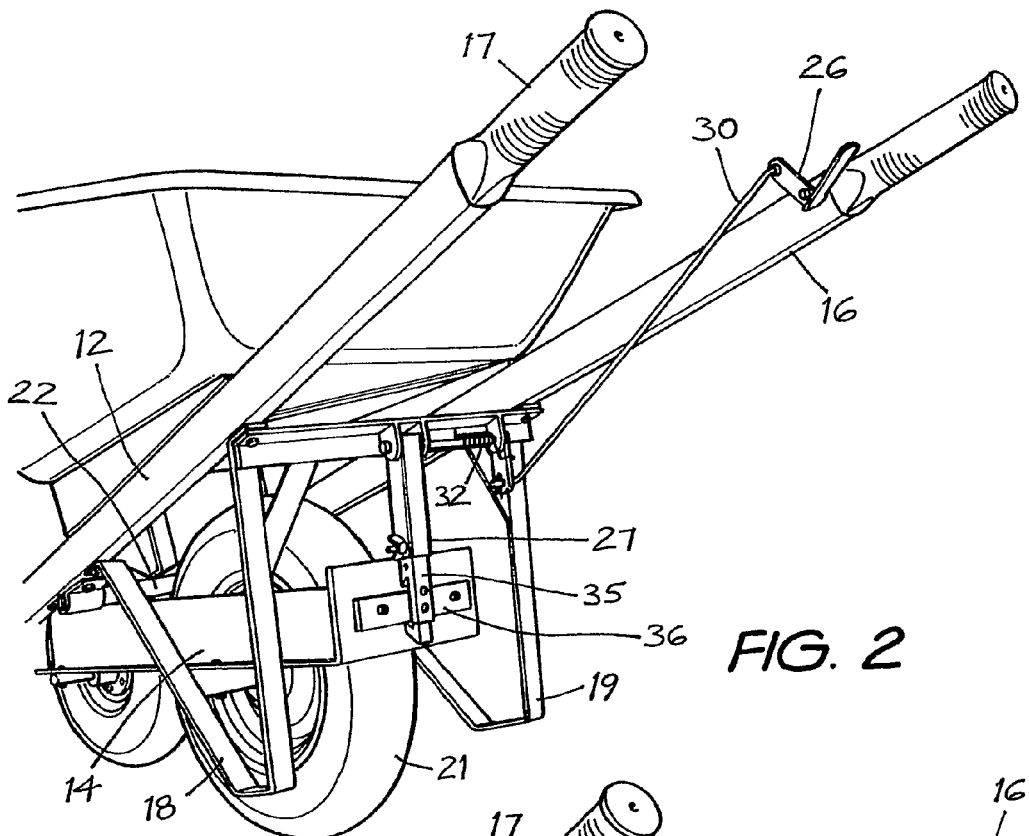
FIG. 2 is a rear perspective view of part of the wheelbarrow of FIG. 1, showing linked top and undercarriage portions of the frame.
Figure 3:
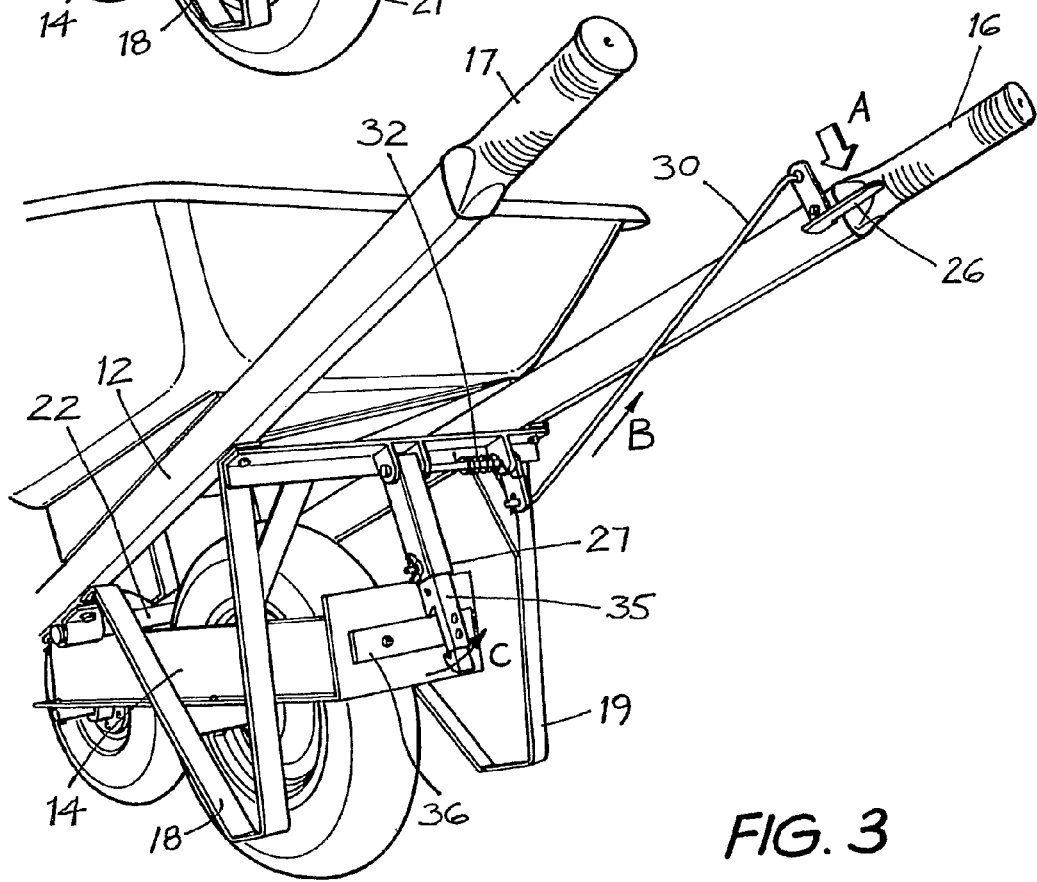
FIG. 3 is a similar view to that of FIG. 2, but showing unlinked top and undercarriage portions of the frame.
Figure 4:
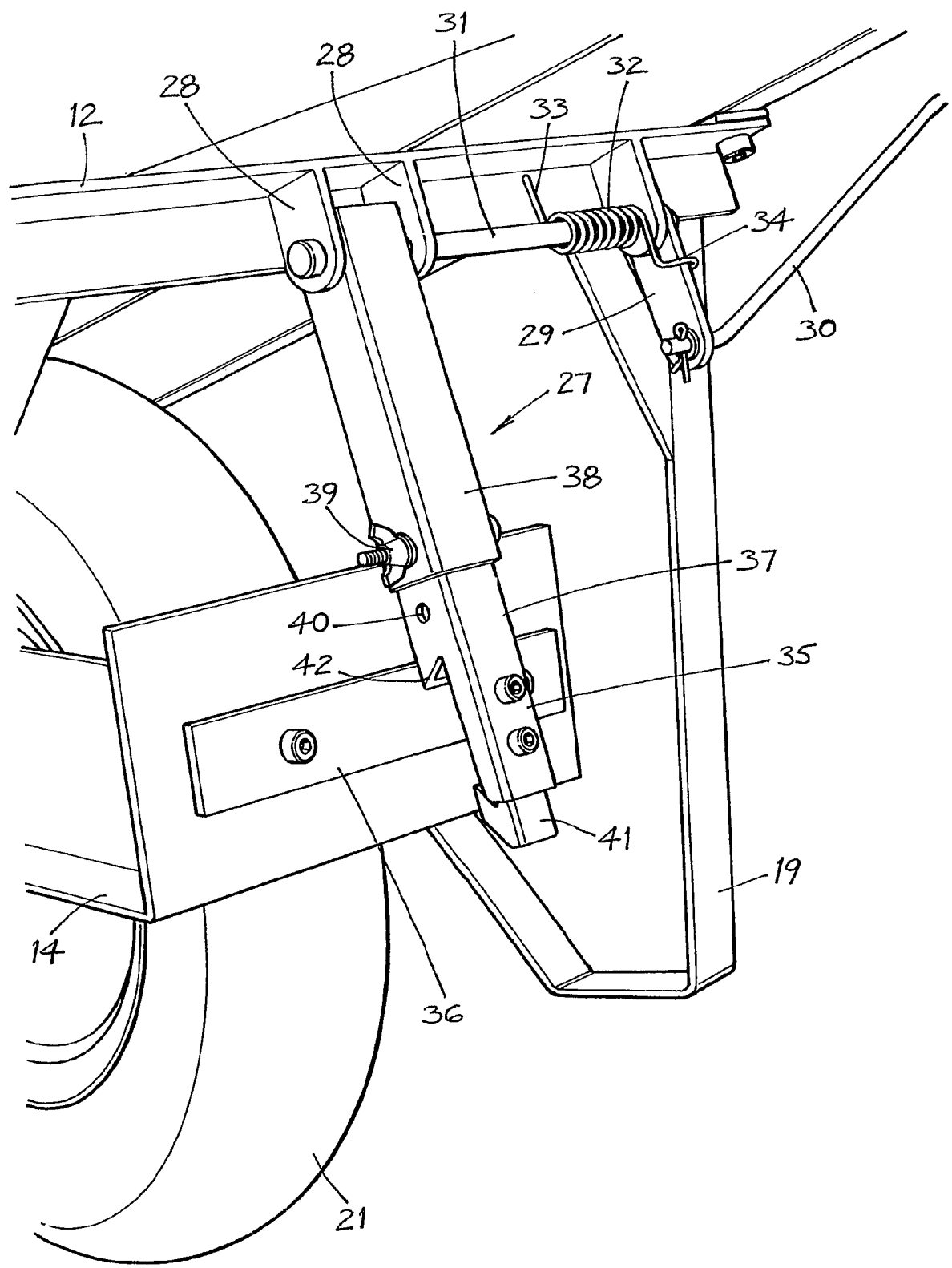
FIG. 4 is an enlarged view of part of the wheelbarrow as shown in FIG. 3, showing the linkage means.
Figure 5:
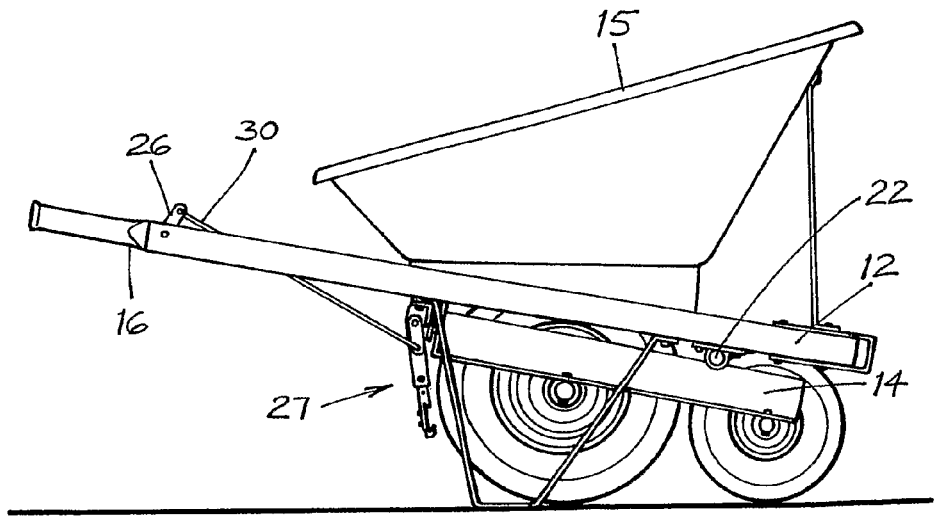
FIG. 5 is a side view of the wheelbarrow of FIG. 1, showing the top and undercarriage portions of the frame unlinked, and the wheelbarrow self supported upon a smooth surface.
Figure 6:
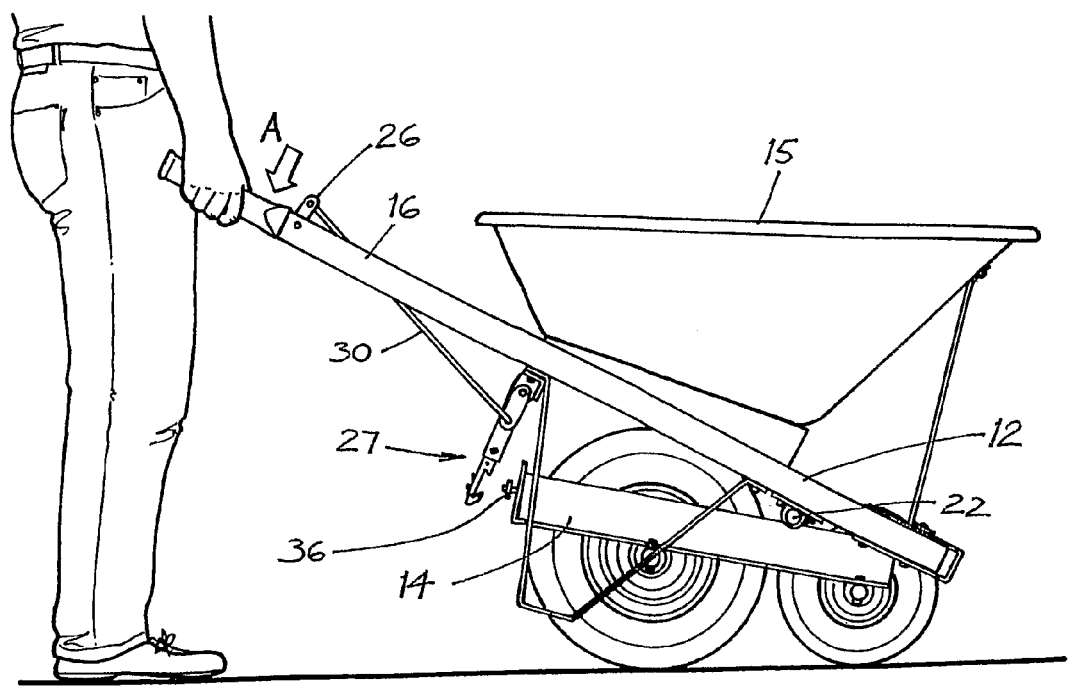
FIG. 6 is a side view of the wheelbarrow of FIG. 1, showing the top portion of the frame lifted from the undercarriage portion of the frame by the user, and the wheelbarrow on a smooth surface.
Figure 7:
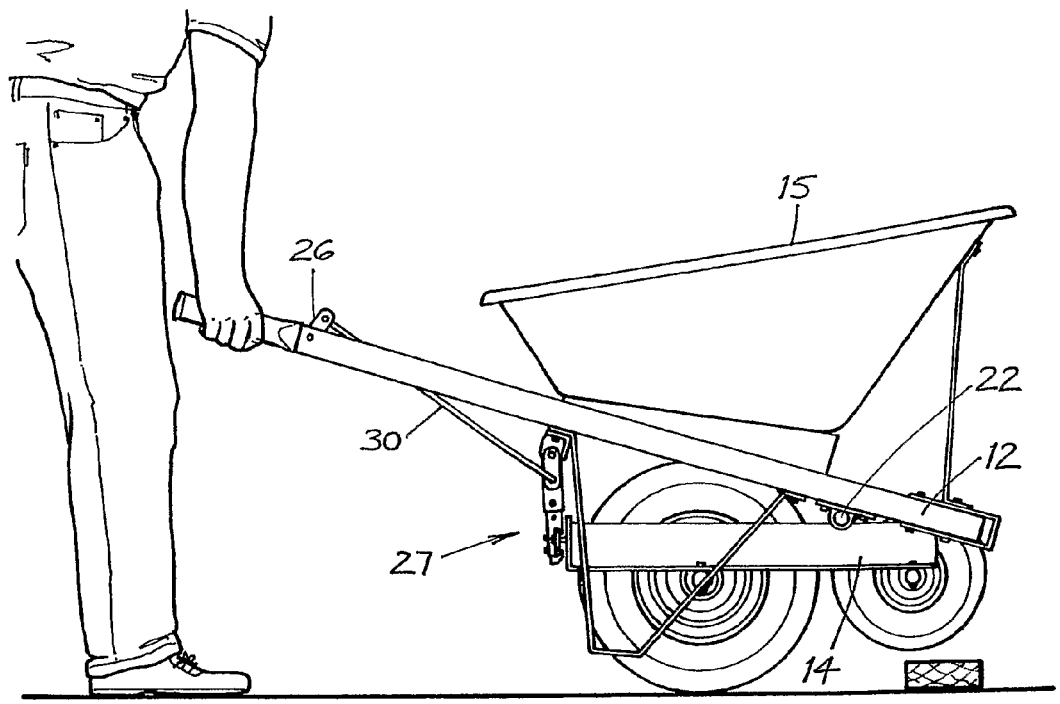
FIG. 7 is a side view of the wheelbarrow of FIG. 1, showing the top and undercarriage portions of the frame linked, and the wheelbarrow being lifted by the user over a step.
Figure 8:
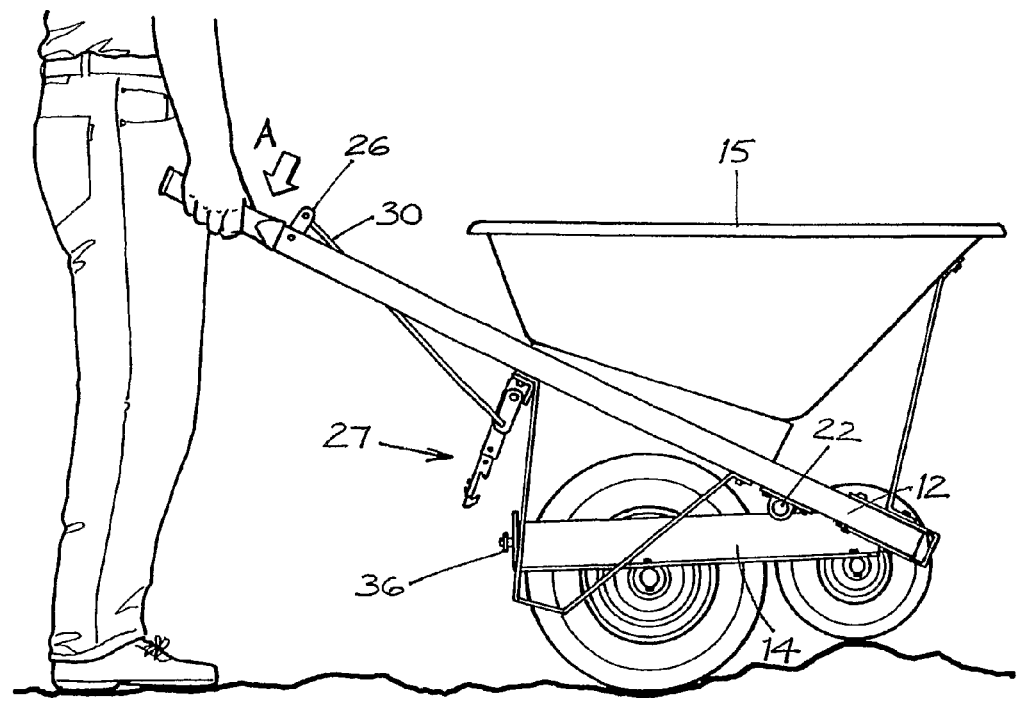
FIG. 8 is a side view of the wheelbarrow of FIG. 1, showing the top portion of the frame pivoting relative to the undercarriage portion of the frame when the wheelbarrow ascends a rough surface.
Figure 9:
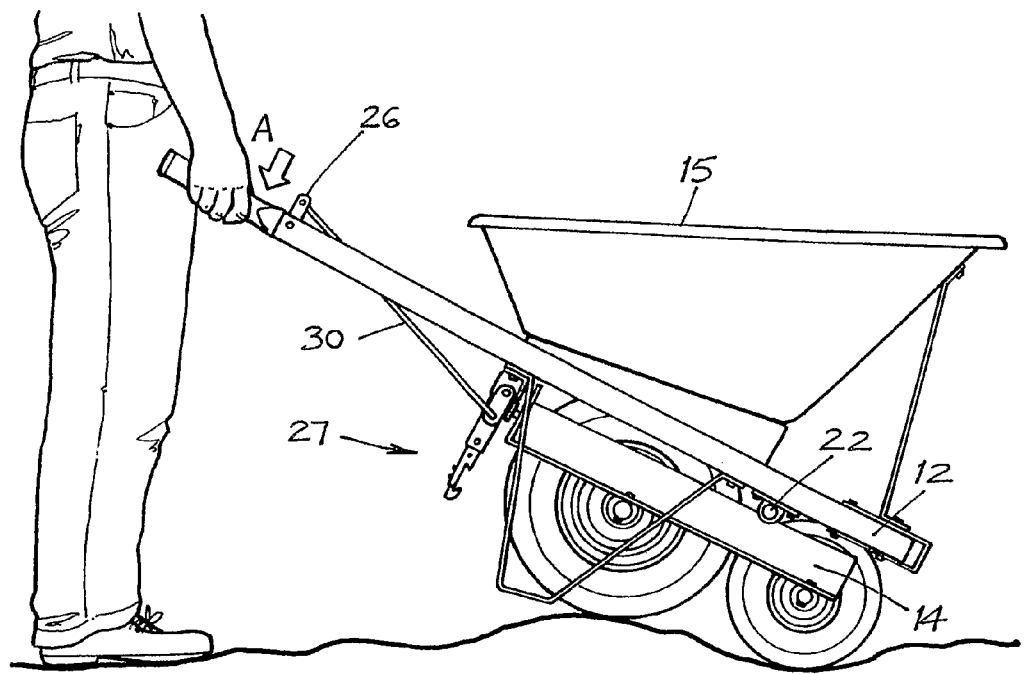
FIG. 9 is a side view of the wheelbarrow of FIG. 1, showing the undercarriage portion of the frame pivoting relative to the top portion of the frame when the wheelbarrow descends a rough surface.
Figure 10:
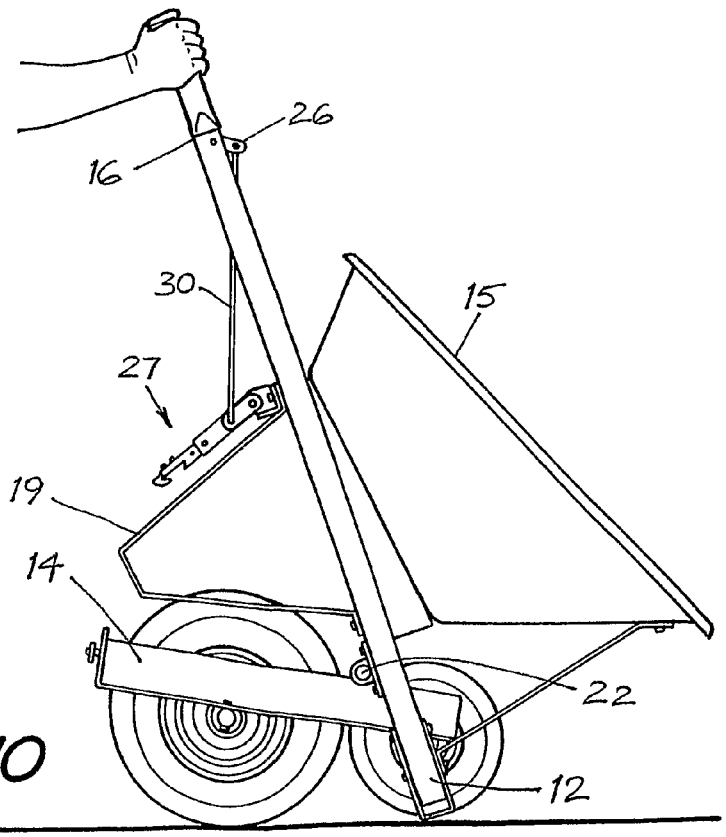
FIG. 10 is a side view of the wheelbarrow of FIG. 1, showing the top portion of the frame lifted from the undercarriage portion of the frame by the user when tipping and dumping material held in the open topped vessel.

The wheelbarrow shown in FIGS. 1 to 10 has a frame, of which there is a top portion 12 and an undercarriage portion 14. There is an open topped vessel 15 mounted on the top portion 12 of the frame, and a pair of handle bars 16, 17 extending rearwardly and integrally from the top portion 12 of the frame. The wheelbarrow also includes a pair of ground engagable legs 18, 19. A first (or front) wheel 20 is connected to a front part of the undercarriage portion 14 of the frame. A second (or rear) wheel 21 is connected to a rear part of the undercarriage portion 14 of the frame. The second wheel 21 is rearwardly aligned with the first wheel 20.

Pivot axis means, in the form of a rod member 22 and a pair of clamp brackets 24, 25, interconnect the top and undercarriage portions 12, 14 and allow the top portion 12 of the frame to pivot relative to the undercarriage portion 14 of the frame.

There is a manually controllable linkage means that includes a finger operated trigger 26 pivotally mounted to the handle bar 16 and which is operable by a thumb of a user's hand holding the handle bar 16. The linkage means also includes a lever arm 27 pivotally connected at a first upper end thereof to rear mount plates 28 of the top portion 12 of the frame and having a second lower end adapted to releasably engage the undercarriage portion 14 of the frame at a rear end thereof.

The linkage means further includes a spring loaded control sub-assembly which has a pivot control arm 29 that is pivotally connected at a free end thereof to a first end of a control rod 30. The control rod 30 has a second end that is pivotally connected to a free end of the trigger 26.

The control sub-assembly also has a control shaft 31 which interconnects the lever arm 27 and the pivot control arm 29 so that, in use, pivotal motion of the pivotal control arm, when the trigger 26 is operated, causes pivotal motion of the lever arm 27.

The control sub-assembly further has a coil spring 32 which surrounds a portion of the control shaft 31. A first end 33 of the coil spring 32 presses against the top portion 12 of the frame and a second end 34 of the coil spring 32 presses against the pivot control arm 29 so that, in use, pivotal motion of the lever arm 27 is spring loaded.

There is a jaw shaped hooked portion 35 at a second lower end of the lever arm 27 which is releasably engagable with a rear cross member 36 of the undercarriage portion 14 of the frame.

The linkage means can be manually controlled by a user to adjust the operable position of the lever arm 27, that is, between a first position and a second position. In the first position, the lever arm 27 links the top and undercarriage portions 12, 14 of the frame so that they are unable to pivot relative to each other about the pivot axis means, whereby both portions 12,14 can pivot (simultaneously) about the first wheel 20 and, for example, the wheelbarrow can be lifted over a step (see FIG. 7). In the second position, the lever arm 27, does not link the top and undercarriage portions 12, 14 of the frame so that they are able to pivot relative to each other about the pivot axis means, whereby, for example, the wheelbarrow can be self supported upon a surface (see FIG. 5) or the top portion 12 can be pivotally lifted from the undercarriage portion 14 to enable the wheelbarrow to travel upon a smooth surface (see FIG. 6) or to tip and dump material held in the open topped vessel 15 (see FIG. 10), or the top portion 12 can pivot relative to the undercarriage portion 14 to enable the wheelbarrow to ascend a rough surface (see FIG. 8), of the undercarriage portion 14 can pivot relative to the top portion 12 to enable the wheelbarrow to descend a rough surface (see FIG. 9). This suspension-like feature provides an advantage of buffering or absorbing the shock normally felt in the user's hands when pushing a conventional wheelbarrow over rough surfaces.

The lever arm 27 of the linkage means assumes its first position when the lever arm 27 engages the rear cross member 36 of the undercarriage portion 14 of the frame, and assumes its second position when the trigger 26 is pressed down (in the direction as shown by the arrow A in FIGS. 3, 6, 8 and 9) to cause, through pulling back of the control rod 30 (in the direction as shown by arrow B in FIG. 3), the lever arm 27 to pivot upwardly (in the direction as shown by the arrow C in FIG. 3) against the bias of the coil spring 32. In this way, the hooked portion 35 at the second end of the lever arm 27 is released from its engagement with the rear cross member 36 of the undercarriage portion 14 of the frame. The user can then lift, or allow for the pivoting of, the top portion 12 of the frame (and hence the open topped vessel) about the pivot axis means or relative to the undercarriage portion 14, without simultaneously pivoting the undercarriage portion 14, by lifting the handle bars 16, 17. In this way, the user can also allow for the pivoting of the undercarriage portion 14 about the pivot axis means or relative to the top portion 12.

The lever arm 27 also includes means for adjusting the distance of the hooked portion 35 from the point of pivotal connection of the lever arm 27 to the rear mount plates 28 of the top portion 12 of the frame. The adjustment means comprises an elongated shaft part 37 of the hooked portion 35 engages telescopically within a hollow body portion 38 of the lever arm 27 and secured in a desired position by a bolt assembly 39 passing through superimposed holes 40 in the overlapping walls of the shaft part 37 and body portion 38.

The jaw shaped hooked portion 35 includes both a lower hook tooth 41 (which faces upwardly) and an upper hook tooth 42 (which faces downwardly), either of which may be releasably engaged with respective lower or upper edges of the rear cross member 36 of the undercarriage portion 14 of the frame. For example, the upper hook tooth 42 is so engaged in FIG. 7, whereas the lower hook tooth 41 is so engaged in FIG. 2.

It will be apparent to persons skilled in the art that various modifications may be made in details of design and construction of the wheelbarrow described above without departing from the scope and ambit of the invention.

The invention claimed is:

1. A wheelbarrow comprising: (a) a frame, having a top portion and an undercarriage portion, (b) an open topped vessel mounted on the top portion of the frame, (c) a pair of handle bars extending rearwardly from the top portion of the frame, (d) a pair of ground engagable legs mounted to the top portion of the frame, (e) a first wheel connected to a front part of the undercarriage portion of the frame, and (f) a second wheel connected to a rear part of the undercarriage portion of the frame and rearwardly aligned with the first wheel, (g) pivot axis means for allowing the top portion of the frame to pivot relative to the undercarriage portion of the frame, and (h) manually controllable linkage means adjustable between first and second positions for allowing a user to link the top and undercarriage portions of the frame when in a first position so that they are unable to pivot relative to each other about the pivot axis means, and for allowing a user to unlink the top and undercarriage portions of the frame when in a second position so that they are able to pivot relative to each other about the pivot axis means.

2. The wheelbarrow of claim 1 wherein the linkage means includes a finger operated trigger pivotally mounted to one of the handle bars.

3. The wheelbarrow of claim 1 wherein the linkage means also includes a lever arm pivotally connected at a first end thereof to the top portion of the frame and having a second end adapted to releasably engage the undercarriage portion of the frame at a rear end thereof.

4. The wheelbarrow of claim 2 wherein the linkage means further includes a spring loaded control sub-assembly which has a pivot control arm that is pivotally connected at a free end thereof to a first end of a control rod, the control rod having a second end that is pivotally connected to a free end of the trigger.

5. The wheelbarrow of claim 3 wherein the second end of the lever arm includes a hooked portion.

6. The wheelbarrow of claim 4 wherein the control sub-assembly also includes a control shaft which interconnects the lever arm and the pivot control arm, so that pivotal motion of the pivot control arm causes pivotal motion of the lever arm.

7. The wheelbarrow of claim 6 wherein the control subassembly further includes a coil spring which surrounds a portion of the control shaft and has a first end that presses against the top portion of the frame and a second end that presses against the pivot control arm, so that pivotal motion of the lever arm is spring loaded.

8. The wheelbarrow of claim 5 wherein the lever arm also includes means for adjusting the distance of the hooked portion from the point of pivotal connection of the lever arm to the top portion of the frame.

9. The wheelbarrow of claim 5 wherein the hooked portion includes a lower hook tooth and an upper hook tooth.

* * * * *